Patented Oct. 19, 1937

2,096,538

UNITED STATES PATENT OFFICE 2,096,538

PROCESS FOR COATING SURFACES CONTAINING SILICA IN COMBINATION

Reginald Graham Durrant, Rosetna, Marlborough, England, assignor to Colloidal Colours Limited, Ynstowyn, Wales, a British Company No Drawing. Application January 23, 1935, Serial No. 3,141. In Great Britain January 30, 1934

3 Claims. (Cl. 91—68)

This invention concerns a process for coating surfaces of materials containing silica in combination such as those of slate, concrete, brickwork, glass or porcelain, with gels obtained from sols prepared from the hydroxides of iron or chromium or mixtures of such sols.

According to the invention the process for coating surfaces of materials containing silica in combination such as those of slate, concrete, brickwork, glass or porcelain, consists in applying to the surface a sol prepared from a hydroxide of iron or chromium or a mixture of such sols with or without admixtures of one or more substances either white or colored but not acting as electrolytes or affecting adversely the sol, drying or substantially drying the sol to form a film on the surface, applying thereto an electrolyte to convert the sol into a gel and drying the gel.

According to the invention also the process for coating surfaces of materials containing silica in combination such as those of slate, concrete, brickwork, glass or porcelain, consists in applying a coating of concentrated acid or concentrated solution of alkali or other electrolyte in solution, to the surface, drying the coating until solid, applying to the treated surface a sol prepared from a hydroxide of iron or chromium or a mixture of such sols, with or without admixtures of one or more substances either white or colored but not acting as electrolytes or adversely affecting the sol, and drying.

In this latter process for instance in the case of slates, electrolytes in solution may be applied to the surfaces after the second drying operation.

Examples of electrolytes which may be employed are solutions of ammonium sulphate or potassium ferrocyanide or sodium silicate.

Examples of admixtures which may be added to the sols are finely divided, red oxide of iron, green oxide of chromium, black oxide of manganese, smalt and ochre. The admixtures may be added to the sols themselves or may be incorporated with the sols in the desiccated form. In the latter case sufficient water is added to bring the sols into the condition required for applying them to the surfaces. The sols may conveniently be used in twice normal concentration, that is containing 37.3 grs. of iron or 34.6 grs. of chromium or 18 grs. of aluminium per litre. The sols may be applied to the surfaces by spraying, painting or pouring over or the surfaces may be dipped into the sols. In all cases the coatings of sols should be dry or substantially dry before the electrolytes are applied for otherwise it has been found that the gels will not adhere to the surfaces but rub off quite easily.

The electrolytes may be applied to the dried sols in a similar manner.

In an embodiment of the invention a sol of ferric hydroxide suitable for carrying out the present process may be made as follows:—

A concentrated solution of ferric chloride in water is precipitated by excess of caustic alkali or ammonia. The resulting ferric hydroxide is filtered and well washed with water to remove chloride together with excess of alkali. After washing, pressure is applied to consolidate the cake of ferric hydroxide and this cake is peptized with a reserved portion of the ferric chloride solution. This portion should not be less than one eighth and not more than one quarter of the quantity employed in producing the cake.

The liquid sol, so obtained, may be diluted roughly to three times its original volume. After this dilution its consistency will be found suitable for application. Alternatively the sol may be evaporated down to the solid state and subsequently be dissolved in water up to a suitable concentration (viz. about twice normal for ferric iron—equivalent normality—i. e. 18.6 grams per litre=normal).

The diluted sol is painted or sprayed onto, for instance, slate to give a film which, when dry, is treated with a sodium silicate solution, for example $Na_2O.4SiO_2.36H_2O$ such as that known as V. W. 60 (I. C. I.) diluted with about an equal weight of water. The silicate solution is sprayed onto the sol film and, when dry, yields a gel which adheres to the surface. The gel has been found to harden on, still more closely, with age.

The proportion of electrolyte required to be added to the sol to form the gel varies with the composition and concentration of the sol.

To prepare a sol of chromium hydroxide, ammonia is used for precipitating the chromium hydroxide from a solution of chromium chloride. The peptization is effected with one fifth of the amount of concentrated solution of chromium chloride used to prepare the cake of chromium hydroxide.

It has been ascertained that sols prepared from ferric hydroxide contain free acid and when the sol is applied to the surface of slate, glass or porcelain on drying, the acid acts on the surface giving silicic acid which acts as a coagulant on the sol so that in this case the gel formation commences on the underneath surface of the sol film and in time converts the sol into a gel. To expedite the gel formation, however, an electrolyte in solution is applied to the outer surface of the sol film when this is dry or substantially dry with the result that gel formation becomes general throughout the film of sol. Sols of chromium hydroxide contain very little acid and hydrochloric acid may be added to the sol.

A large variety of tints may be imparted to the gels by selecting the powders serving as admixtures. Thus sols of ferric hydroxide, without admixtures, give brown gels but produce green tinted gels if mixed with chromium oxide, red tinted gels if mixed with ferric oxide and buff tinted gels if mixed with ochre. Sols of chromium hydroxide produce green gels which similarly may be modified with appropriately colored powders. Thus if smalt is added they give blue tints. Mixtures of powders may be employed. If desired the admixtures may be applied, as by blowing, to the applied sol before it has dried. Thus ochre admixed with green oxide of chromium gives a pleasant yellowish green tint while ochre mixed with a little red oxide of iron gives a terra cotta tint to the ferric gel.

By means of this invention very pleasing and lasting tints of varying colors and shades may be imparted to the surfaces of the originating materials. Thus ordinary slate may be caused to assume, for example, a reddish or greenish tint by incorporating suitable coloring powders into the sol before it is applied to the surface.

The expression "slate" as used herein is deemed to include roofing materials such as tiles.

What I claim is:

1. A process for coating a surface of slate which comprises the steps of applying to the surface at least one sol prepared from a hydroxide of the group consisting of iron and chromium, drying the sol to form a film on the surface, applying to the film an electrolyte selected from the group consisting of ammonium sulphate, potassium ferrocyanide and sodium silicate to convert the sol into a gel, and drying the gel.

2. A process for coating a surface of slate which comprises the steps of applying to the surface a mixture of at least one sol prepared from a hydroxide of the group consisting of iron and chromium and at least one coloring substance having no adverse effect upon the sol, drying the mixture to form a film on the surface, applying to the film an electrolyte selected from the group consisting of ammonium sulphate, potassium ferrocyanide and sodium silicate to convert the sol into a gel, and drying the gel.

3. A process for coating a surface of slate which comprises the steps of applying to the surface a mixture of at least one sol prepared from a hydroxide of the group consisting of iron and chromium and at least one coloring substance having no adverse effect upon the sol, drying the mixture to form a film on the surface, applying to the film an electrolyte selected from the group consisting of ammonium sulphate, potassium ferrocyanide and sodium silicate to convert the sol into a gel, drying the gel, and applying an electrolyte selected from the group consisting of ammonium sulphate, potassium ferrocyanide and sodium silicate in solution thereto.

REGINALD GRAHAM DURRANT.